United States Patent
Lee et al.

(10) Patent No.: US 9,713,195 B2
(45) Date of Patent: Jul. 18, 2017

(54) METHOD AND APPARATUS FOR RELEASING CONNECTION IN WIRELESS COMMUNICATION SYSTEM

(71) Applicant: LG Electronics Inc., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 14/434,882

(22) PCT Filed: Oct. 28, 2013

(86) PCT No.: PCT/KR2013/009627
§ 371 (c)(1),
(2) Date: Apr. 10, 2015

(87) PCT Pub. No.: WO2014/069856
PCT Pub. Date: May 8, 2014

(65) Prior Publication Data
US 2015/0282248 A1 Oct. 1, 2015

Related U.S. Application Data (60) Provisional application No. 61/719,917, filed on Oct. 29, 2012.

(51) Int. Cl.
*H04W 76/06* (2009.01)
*H04W 72/10* (2009.01)
*H04W 76/02* (2009.01)

(52) U.S. Cl.
CPC .......... *H04W 76/06* (2013.01); *H04W 72/10* (2013.01); *H04W 76/02* (2013.01); *H04W 76/066* (2013.01); *H04W 76/028* (2013.01)

(58) Field of Classification Search
None
See application file for complete search history.

(56) References Cited

U.S. PATENT DOCUMENTS

| 5,666,364 A | 9/1997 | Pierce et al. |
| 6,366,582 B1 | 4/2002 | Nishikado et al. |
| 7,200,110 B1 | 4/2007 | Burns et al. |
| 7,333,438 B1 | 2/2008 | Rabie et al. |
| 2005/0100021 A1* | 5/2005 | Suomi ..................... H04L 47/10 370/395.21 |
| 2008/0225785 A1* | 9/2008 | Wang ................... H04W 74/002 370/329 |

(Continued)

FOREIGN PATENT DOCUMENTS

EP 2509386 10/2012

*Primary Examiner* — Ricky Ngo
*Assistant Examiner* — Michael Phillips
(74) *Attorney, Agent, or Firm* — Dentons US LLP (57) ABSTRACT

A method and apparatus of releasing a connection in a wireless communication system is provided. A user equipment (UE) establishes a radio resource control (RRC) connection with a specific establishment cause, receiving paging indicating connection release and release information including an establishment cause or a logical channel priority, and releasing the RRC connection depending on the establishment cause or the logical channel priority included in the release information.

2 Claims, 10 Drawing Sheets

(56) References Cited

U.S. PATENT DOCUMENTS

| | | | |
|---|---|---|---|
| 2010/0330995 A1* | 12/2010 | Aoyama | H04W 28/10 455/436 |
| 2011/0305137 A1 | 12/2011 | Chu et al. | |
| 2012/0208527 A1 | 8/2012 | Park | |
| 2012/0269122 A1 | 10/2012 | Lee | |
| 2013/0035064 A1* | 2/2013 | Balachandran | H04W 48/02 455/411 |
| 2013/0042011 A1* | 2/2013 | Sugizaki | H04W 4/005 709/227 |
| 2013/0095863 A1* | 4/2013 | Dhanda | H04W 48/02 455/458 |
| 2013/0107718 A1* | 5/2013 | Edara | H04W 72/1242 370/236 |
| 2013/0272121 A1* | 10/2013 | Stanwood | H04L 47/2475 370/230 |
| 2014/0064176 A1* | 3/2014 | Anchan | H04W 74/006 370/312 |

\* cited by examiner

METHOD AND APPARATUS FOR RELEASING CONNECTION IN WIRELESS COMMUNICATION SYSTEM

This application is a 35 USC §371 National Stage entry of International Application No. PCT/KR2013/009627 filed on Oct. 28, 2013, and claims priority to U.S. Provisional Application No. 61/719,917 filed on Oct. 29, 2012, all of which are hereby incorporated by reference in their entireties as if fully set forth herein.

BACKGROUND OF THE INVENTION

Field of the Invention

The present invention relates to wireless communications, and more particularly, to a method and apparatus for releasing a connection in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

A radio resource control (RRC) state indicates whether an RRC layer of a user equipment (UE) is logically connected to an RRC layer of an evolved-UMTS terrestrial radio access network (E-UTRAN). When an RRC connection is established between the RRC layer of the UE and the RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

An RRC connection release procedure is used to release the RRC connection, which includes the release of the established radio bearers as well as all radio resources. A method for releasing multiple RRC connections efficiently may be required.

SUMMARY OF THE INVENTION

The present invention provides a method for releasing a connection in a wireless communication system. The present invention provides a group connection release based on an establishment cause or a logical channel priority.

In an aspect, a method of releasing, by a user equipment (UE), a connection in a wireless communication system is provided. The method includes establishing a connection with a network for a specific cause, receiving group connection release information indicating one of prioritized cause or non-prioritized cause from the network, releasing the connection based on the group connection release information if the specific cause is included in the non-prioritized cause or is not included in the prioritized cause.

The prioritized access may correspond to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

The group connection release information may be received via one of a paging message, system information, or a radio resource control (RRC) message.

The group connection release information may further include a connection release indication which indicates whether or not the UE releases the connection.

The group connection release information may further include wait time which indicates how long access to the network is barred.

The group connection release information may further include a probability factor.

In another aspect, a method of releasing, by a user equipment (UE), a connection in a wireless communication system is provided. The method include establishing a connection with a network, configuring a channel with a first priority, receiving group connection release information indicating a second priority from the network, determining whether or not to release the connection by comparing the first priority with the second priority.

The method may further include releasing the connection if the highest first priority for the configured channel is equal to or lower than the second priority included in the group connection release information.

The method may further include releasing the connection if the lowest first priority for the configured channel is equal to or lower than the second priority included in the group connection release information.

The method may further include releasing the connection if the first priority with which the channel is configured is not included in the second priority.

The second priority may correspond to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

The method may further include releasing the connection if the first priority with which the channel is configured is included in the second priority.

Signaling overhead in a downlink for releasing connections can be avoided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
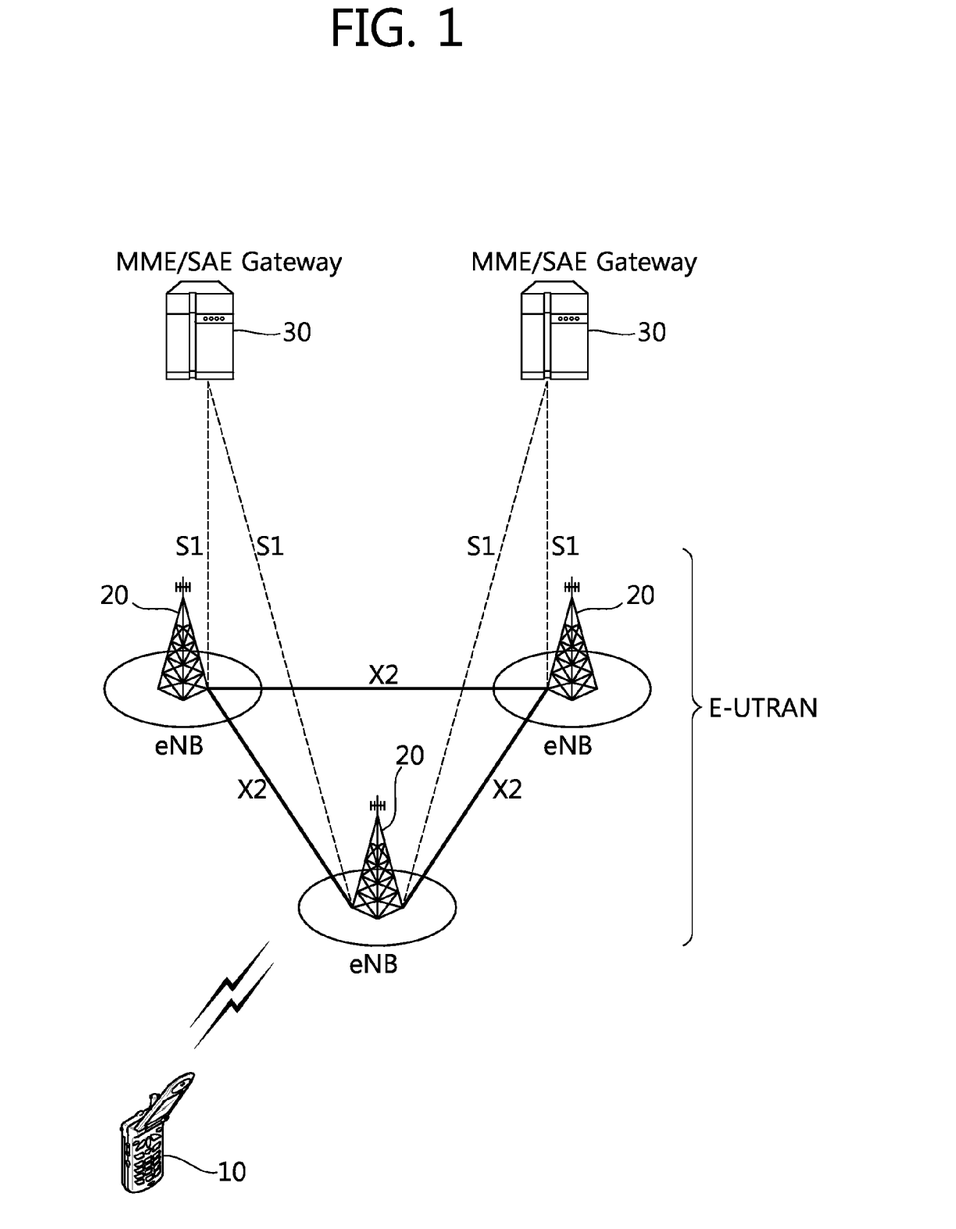
FIG. 1 shows LTE system architecture.

FIG. 1 shows LTE system architecture.

The LTE system architecture includes a user equipment (10), an evolved-UMTS terrestrial radio access network (E-UTRAN) and an evolved packet core (EPC). The UE 10 may be fixed or mobile, and may be referred to as another terminology, such as a mobile station (MS), a user terminal (UT), a subscriber station (SS), a wireless device, etc. The E-UTRAN includes a plurality of evolved node-Bs (eNBs) 20. The eNB 20 provides a control plane and a user plane to the UE 10. The eNB 20 is generally a fixed station that communicates with the UE 10 and may be referred to as another terminology, such as a base station (BS), a base transceiver system (BTS), an access point, etc. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

The EPC includes a mobility management entity (MME) which is in charge of control plane functions, and a serving gateway (S-GW) which is in charge of user plane functions. The EPC may further include a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN.

Interfaces for transmitting user traffic or control traffic may be used. The UE 10 and the eNB 20 are connected by means of a Uu interface. The eNBs 20 are interconnected by means of an X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

Figure 2:
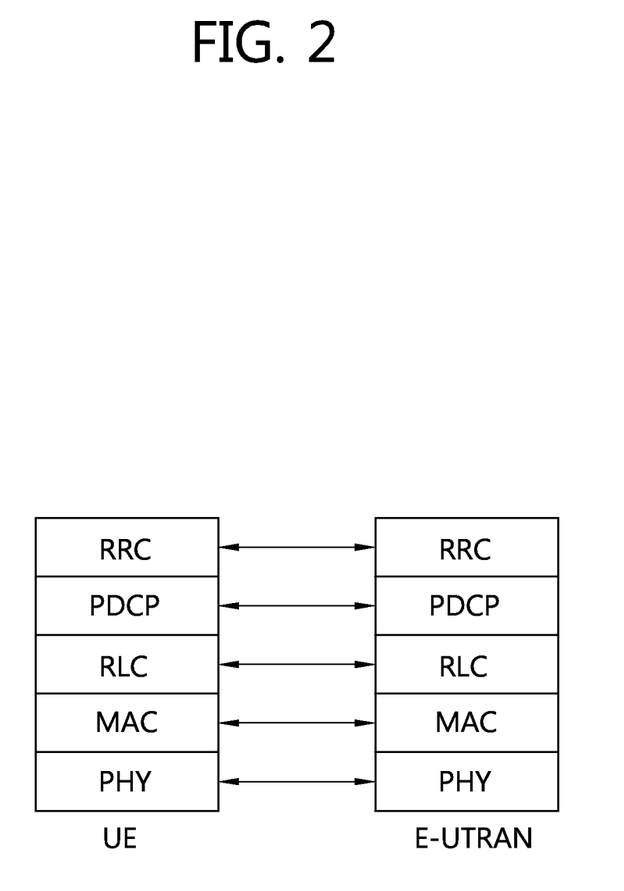
FIG. 2 shows a control plane of a radio interface protocol of an LTE system.
Figure 3:
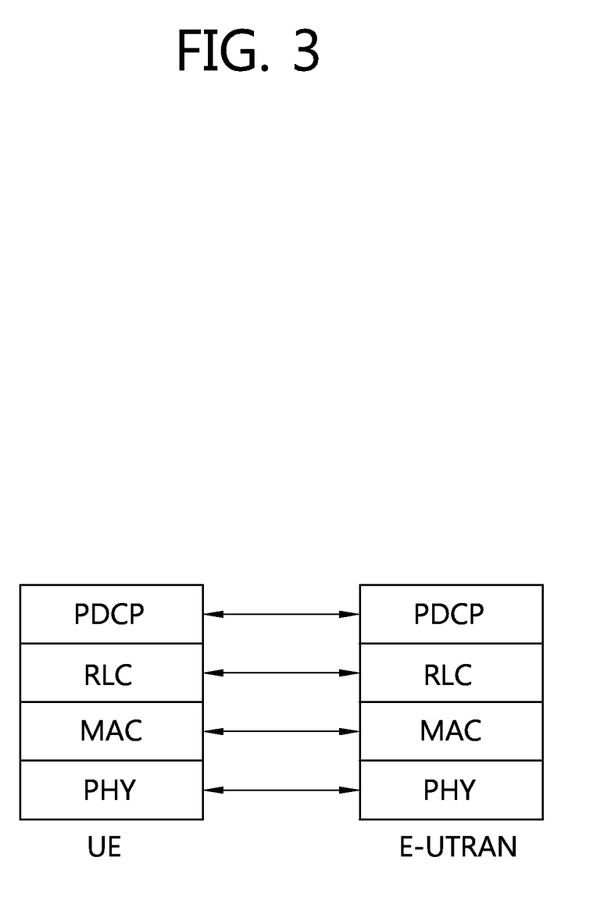
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides an upper layer with an information transfer service through a physical channel. The PHY layer is connected to a medium access control (MAC) layer, which is an upper layer of the PHY layer, through a transport channel. Data is transferred between the MAC layer and the PHY layer through the transport channel. The transport channel is classified into a common transport channel and a dedicated transport channel according to whether the channel is shared or not. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH.

The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
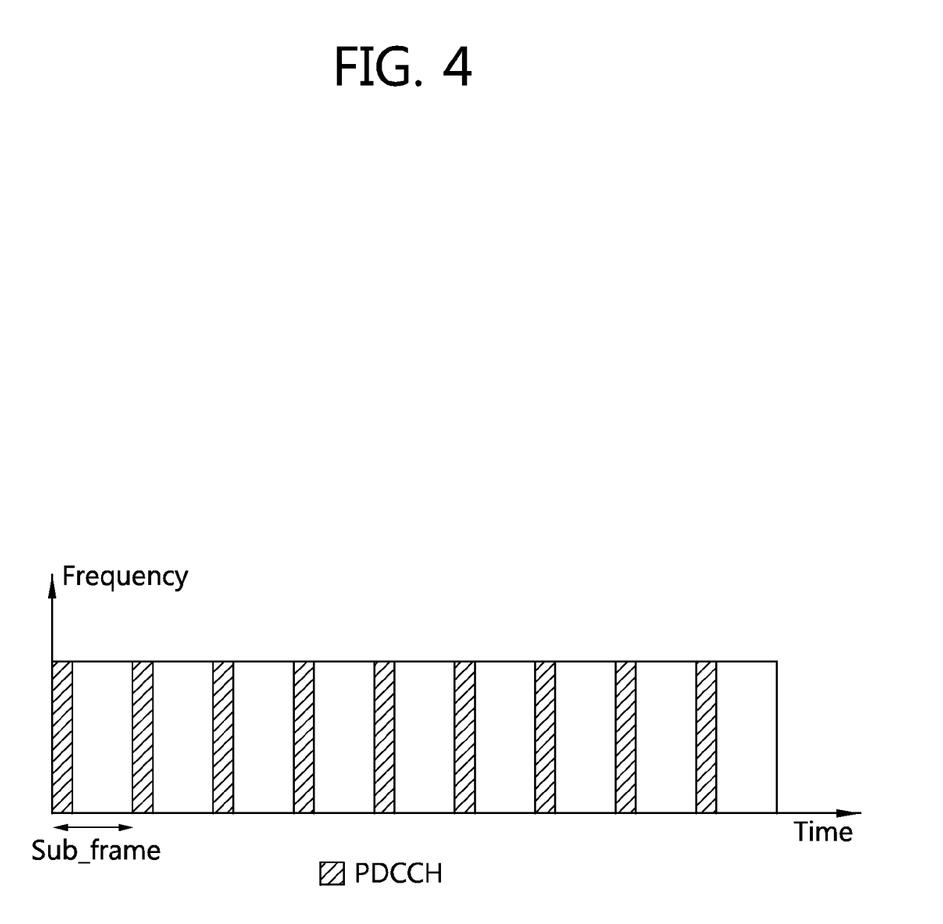
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks may be transmitted with the same periodicity. Traffic or control signals of a multimedia broadcast/multicast service (MBMS) may be transmitted through the DL-SCH or a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belongs to the L2. The MAC layer provides a function of mapping multiple logical channels to multiple transport channels. The MAC layer also provides a function of logical channel multiplexing by mapping multiple logical channels to a single transport channel. The MAC layer is connected to a radio link control (RLC) layer, which is an upper layer of the MAC layer, through the logical channel. The logical channel is classified into a control channel for transmitting control plane information and a traffic channel for transmitting user plane information, according to a type of transmitted information.

The logical channel is located above the transport channel, and is mapped to the transport channel. The logical includes a broadcast control channel (BCCH), a paging control channel (PCCH), a common control channel (CCCH), a multicast control channel (MCCH), a multicast traffic channel (MTCH), etc.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression, which decreases a size of an Internet protocol (IP) packet header which contains relatively large-sized and unnecessary control information, to support effective transmission in a radio section having a narrow bandwidth, when IP packets, i.e., IPv4 or IPv6, transmitted. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L1 and L2 for data delivery between the UE and the network. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Figure 5:
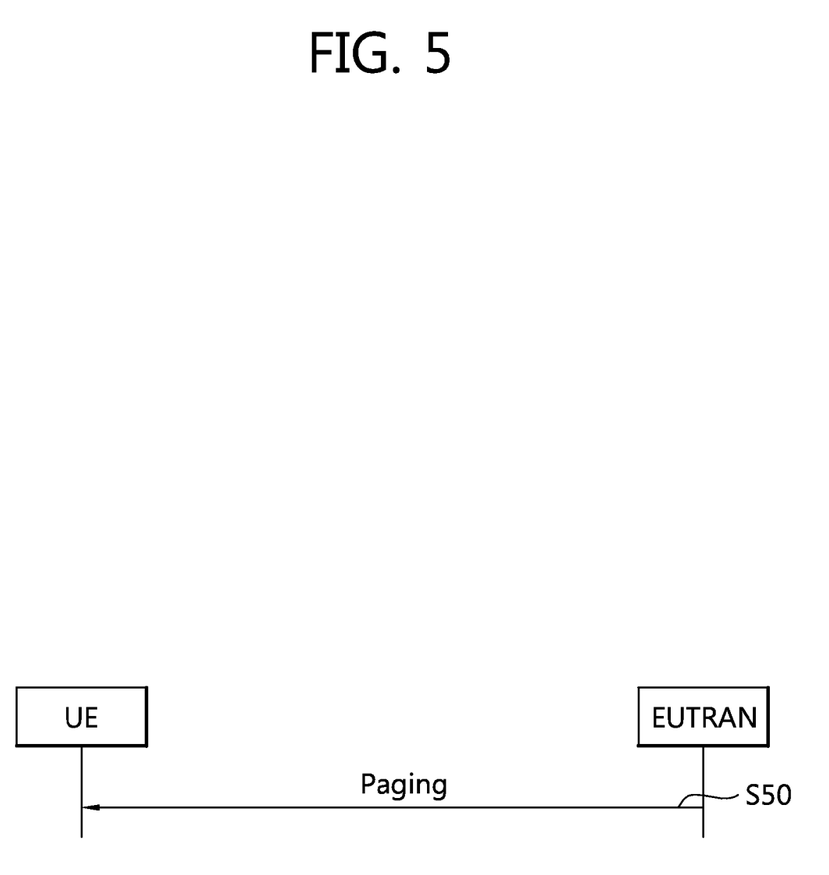
FIG. 5 shows a paging procedure.

FIG. 5 shows a paging procedure. It may be referred to Section 5.3.2 of 3GPP TS 36.331 V11.1.0 (2012-09).

At step S50, the E-UTRAN transmits a paging message to the UE. The purpose of this procedure is to transmit paging information to a UE in RRC_IDLE and/or, to inform UEs in RRC_IDLE and UEs in RRC_CONNECTED about a system information change and/or, to inform about an earthquake and tsunami warning service (ETWS) primary notification and/or ETWS secondary notification and/or; to inform about a commercial mobile alert service (CMAS) notification. The paging information is provided to upper layers, which in response may initiate RRC connection establishment, e.g., to receive an incoming call.

The E-UTRAN initiates the paging procedure by transmitting the Paging message at the UE's paging occasion. The E-UTRAN may address multiple UEs within a Paging message by including one PagingRecord for each UE. The E-UTRAN may also indicate a change of system information, and/or provide an ETWS notification or a CMAS notification in the Paging message.

Upon receiving the Paging message, the UE shall:
1> if in RRC_IDLE, for each of the PagingRecord, if any, included in the Paging message:
2> if the ue-Identity included in the PagingRecord matches one of the UE identities allocated by upper layers:
3> forward the ue-Identity and the cn-Domain to the upper layers;
1> if the systemInfoModification is included:
2> re-acquire the required system information using the system information acquisition procedure.

Figure 6:
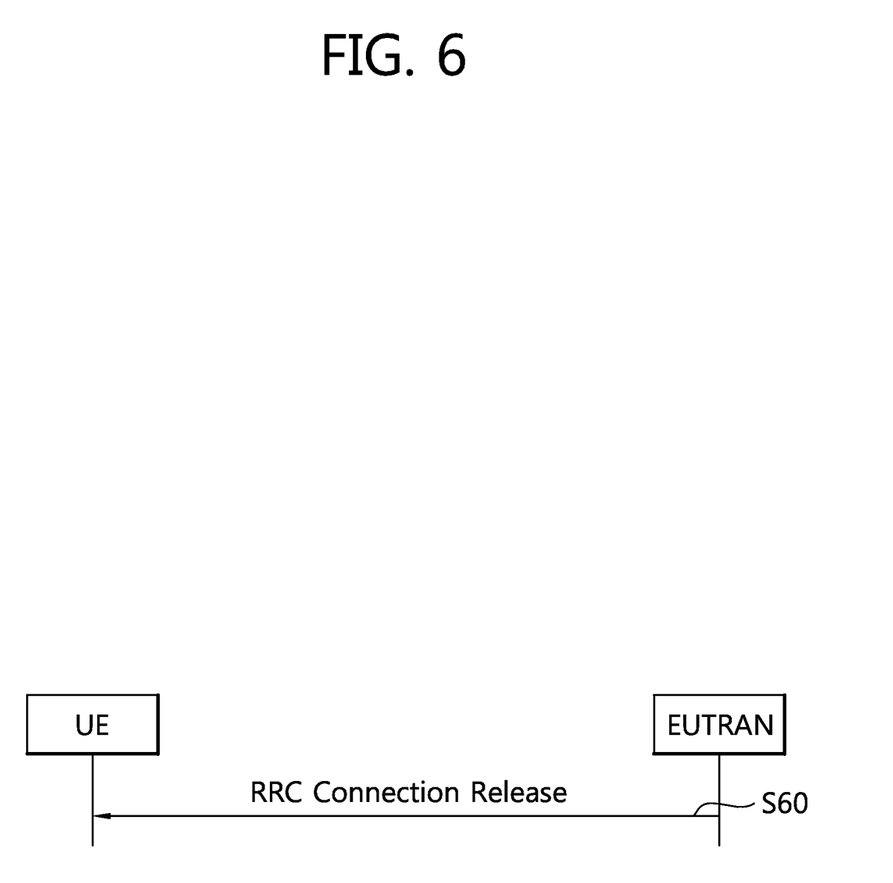
FIG. 6 shows an RRC connection release procedure.

1> if the etws-Indication is included and the UE is ETWS capable:
2> re-acquire SystemInformationBlockType1 immediately, i.e., without waiting until the next system information modification period boundary;
2> if the schedulingInfoList indicates that SystemInformationBlockType10 is present:
3> acquire SystemInformationBlockType10;
2> if the schedulingInfoList indicates that SystemInformationBlockType11 is present:
3> acquire SystemInfonnationBlockType11;
1> if the cmas-Indication is included and the UE is CMAS capable:
2> re-acquire SystemInformationBlockType1 immediately, i.e., without waiting until the next system information modification period boundary;
2> if the schedulingInfoList indicates that SystemInformationBlockType12 is present:
3> acquire SystemInformationBlockType12;
1> if in RRC_IDLE, the eab-ParamModification is included and the UE is extended access barring (EAB) capable:
2> re-acquire SystemInformationBlockType14 using the system information acquisition procedure;

FIG. 6 shows an RRC connection release procedure. It may be referred to Section 5.3.8 of 3GPP TS 36.331 V11.1.0 (2012-09).

At step S60, the E-UTRAN transmits an RRCConnectionRelease message to the UE. The purpose of this procedure is to release the RRC connection, which includes the release of the established radio bearers as well as all radio resources.

The E-UTRAN initiates the RRC connection release procedure to a UE in RRC_CONNECTED. Upon receiving the RRCConnectionRelease message, the UE shall:

1> delay the following actions defined in this sub-clause 60 ms from the moment the RRCConnectionRelease message was received or optionally when lower layers indicate that the receipt of the RRCConnectionRelease message has been successfully acknowledged, whichever is earlier;
1> if the RRCConnectionRelease message includes the idleModeMobilityControlInfo:
2> store the cell reselection priority information provided by the idleModeMobilityControlInfo;
2> if the T320 is included:
3> start timer T320, with the timer value set according to the value of t320;
1> else:
2> apply the cell reselection priority information broadcast in the system information;
1> if the releaseCause received in the RRCConnectionRelease message indicates loadBalancingTAURequired:
2> perform the actions upon leaving RRC_CONNECTED, with release cause 'load balancing TAU required';
1> else if the releaseCause received in the RRCConnectionRelease message indicates cs-FallbackHighPriority:
2> perform the actions upon leaving RRC_CONNECTED, with release cause 'CS Fa llback High Priority';
1> else:
2> if the extendedWaitTime is present and the UE supports delay tolerant access:
3> forward the extendedWaitTime to upper layers;
2> perform the actions upon leaving RRC_CONNECTED, with release cause 'other';

The UE shall:
1> if T320 expires:
2> if stored, discard the cell reselection priority information provided by the idleModeMobilityControlInfo or inherited from another RAT;
2> apply the cell reselection priority information broadcast in the system information;

Meanwhile, the RRC connection release procedure may be requested by upper layers. The purpose of this procedure is to release the RRC connection. Access to the current primary cell (PCell) may be barred as a result of this procedure.

The UE initiates the procedure when upper layers request the release of the RRC connection. The UE shall not initiate the procedure for power saving purposes.

The UE shall:
1> if the upper layers indicate barring of the PCell:
2> treat the PCell used prior to entering RRC_IDLE as barred;
1> perform the actions upon leaving RRC_CONNECTED, with release cause 'other';

When overload situation occurs, the eNB may release some of RRC connections for off-loading. In this case, the eNB should release different RRC connections by transmitting different RRC connection release messages. Thus, there will be overhead in downlink for those RRC connection releases.

Accordingly, a method for releasing multiple RRC connections without transmitting different RRC connection release messages may be proposed. According to an embodiment of the present invention, the UE establishes an RRC connection with a specific establishment cause, receives a paging message indicating connection release and release information including an establishment cause or a logical channel priority, and releases the RRC connection depending on the establishment cause or the logical channel priority included in the release information.

Figure 7:
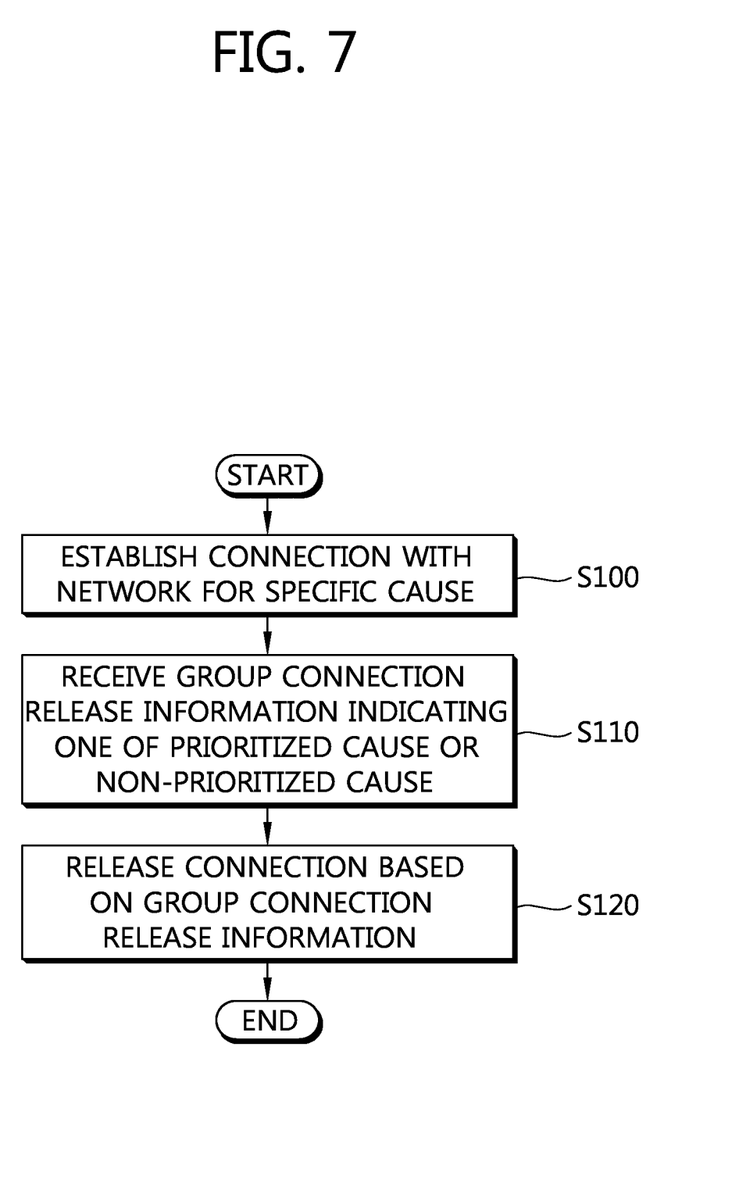
FIG. 7 shows an example of a method for releasing a connection according an embodiment of the present invention.

FIG. 7 shows an example of a method for releasing a connection according an embodiment of the present invention.

At step S100, the UE establishes a connection with a network for a specific cause. At step S110, the UE receives group connection release information indicating one of prioritized cause or non-prioritized cause. The group connection release information may be received via a paging message. The paging message may include indication of connection release.

At step S120, the UE releases the connection based on the group connection release information if the specific cause is included in the non-prioritized cause or is not included in the prioritized cause. The connection may be released if the group connection release information includes the specific cause. In this case, the group connection release information indicates at least one non-prioritized cause. Or, the connection may be released if the group connection release information does not include the specific cause. In this case, the group connection release information indicates at least one prioritized cause. That is, if the connection is established with a non-prioritized cause, the connection may be released. The prioritized cause may correspond to an establishment cause including emergency access or high priority access. Or, the prioritized cause may correspond to a logical channel, traffic/bearer type, or logical channel priority including at least one of control element/information in MAC, RLC or PDCP, a DRB for voice/video service, SRB 0, SRB 1 and SRB 2.

Figure 8:
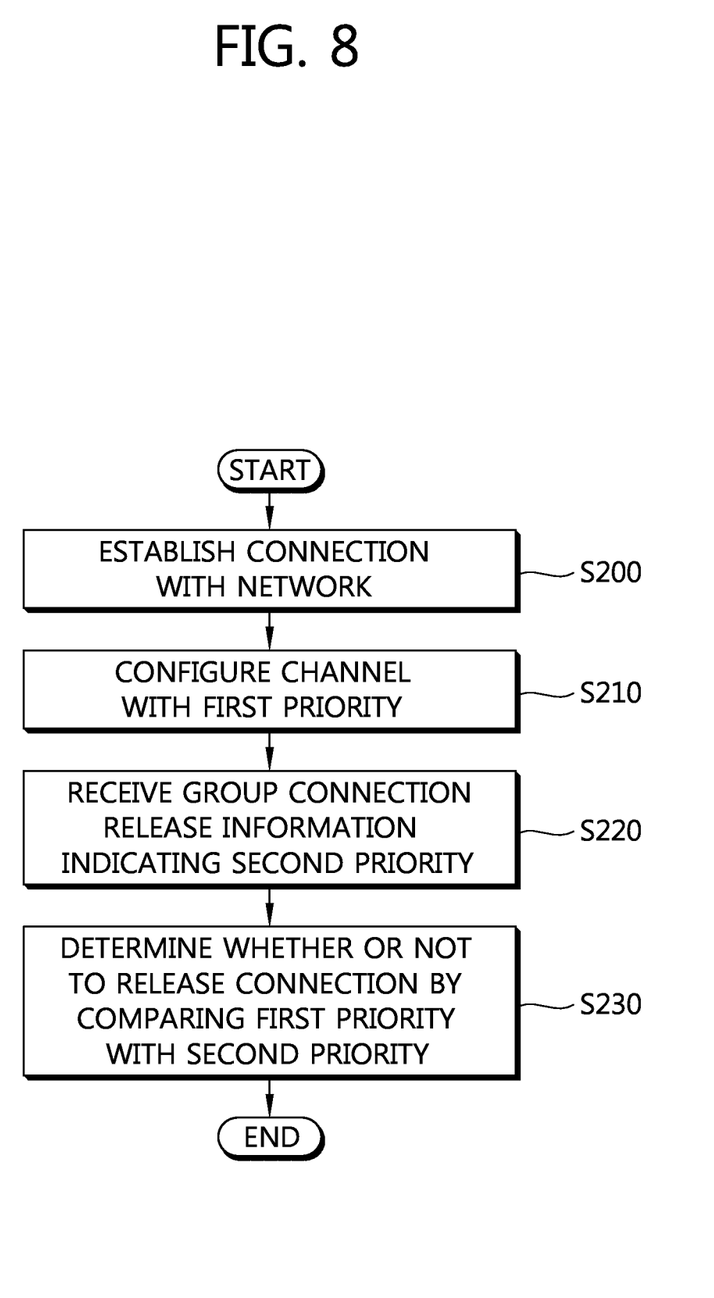
FIG. 8 shows another example of a method for releasing a connection according an embodiment of the present invention.

FIG. 8 shows another example of a method for releasing a connection according an embodiment of the present invention.

At step S200, the UE establishes a connection with a network. At step S210, the UE configures a channel or (data) bearer with a first priority. At step S220, the UE receives group connection release information indicating a second priority. The group connection release information may be received via a paging message. The paging message may include indication of connection release.

At step S230, the UE determines whether or not to release the connection by comparing the first priority with the second priority. The connection may be released if the highest first priority for the configured channel is equal to or lower than the second priority included in the group connection release information. Or, the connection may be released if the lowest first priority for the configured channel is equal to or lower than the second priority included in the group connection release information. That is, the first priority for the configured channel is compared with the second priority included in the group connection release information, and if the first priority is equal to or lower than the second priority, the connection may be released.

Alternatively, the connection may be released if the UE does not have any configured channel of which the first priority is not included in the group connection release information including the second priority. In this case, the second priority may correspond to non-prioritized access. Or, the connection may be released if the UE does not have any configured channel of which the first priority is included in the release information including the second priority. In this case, the second priority may correspond to prioritized access. The prioritized access may correspond to a logical channel, traffic/bearer type, or logical channel priority including at least one of control element/information in MAC, RLC or PDCP, a DRB for voice/video service, SRB 0, SRB 1 and SRB 2.

Figure 9:
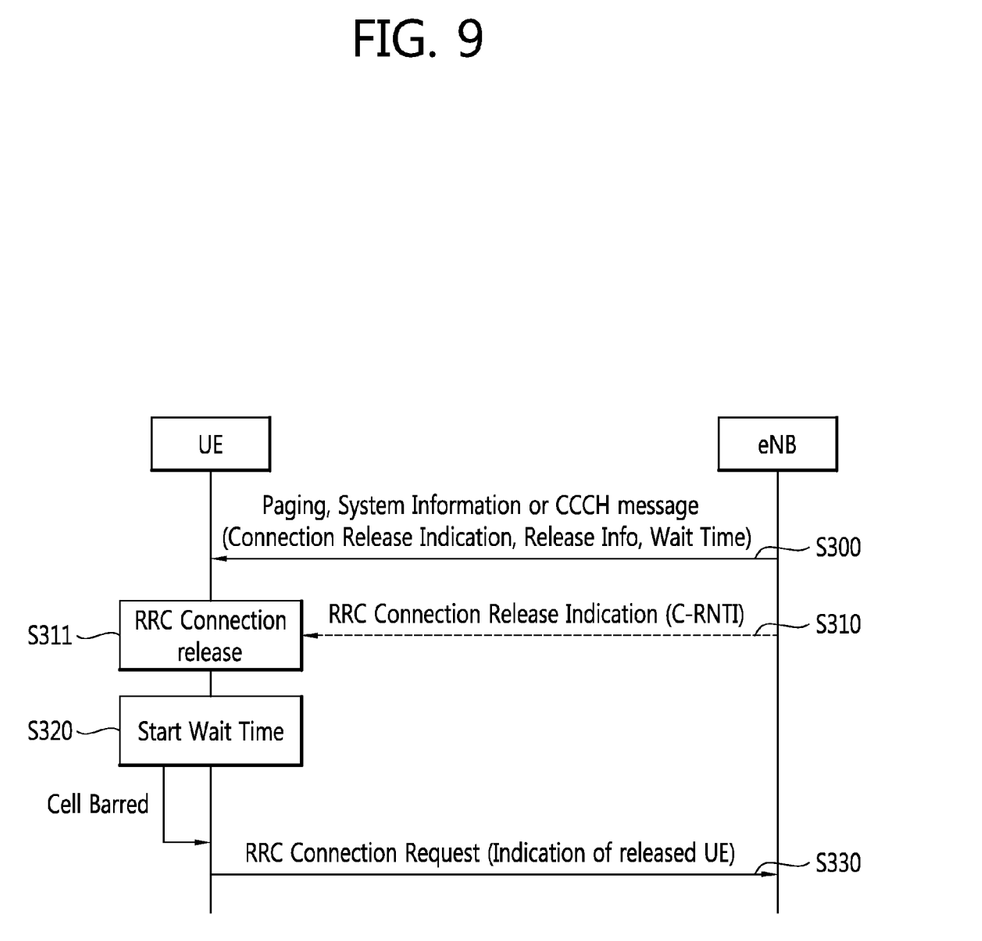
FIG. 9 shows another example of a method for releasing a connection according an embodiment of the present invention.

FIG. 9 shows another example of a method for releasing a connection according an embodiment of the present invention.

At step S300, when overload occurs, the eNB may transmit a connection release indication to one or more UEs. The connection release indication may indicate whether or not the UE in RRC_CONNECTED releases its RRC connection. The connection release indication may be transmitted to the UEs via a paging message on a PCCH, system information on a BCCH, or an RRC message on a CCCH.

The message carrying the connection release indication may further include the following information:
  Release information: this is used to indicate which UEs should release their RRC connections, and also indicate whether the UEs should release their RRC connections or the UEs should perform RRC connection reestablishment. This may include one or more establishment causes or one or more logical channel priorities. This may inform the UEs that all the UEs at the cell should release their RRC connections. This may also include a release cause indicating the reason why group release is indicated, e.g., overload. This may also indicate to the UEs that the UEs should perform RRC connection reestablishment procedure upon receiving this connection release indication.
  Wait time: this is used to inform the UEs how long access to the cell is barred in case that the UEs release their RRC connection.
  Probability factor: this is used to indicate whether or not the UEs should release their RRC connections.

The UE in RRC_CONNECTED may monitor the paging message, system information, and RRC message at the cell. At step S310, the UE may receive the RRC message carrying the connection release indication (and possibly together with release information and wait time) from the cell.

If the system information carries the connection release indication, the paging message may indicate whether or not the system information carries the connection release indication. In this case, upon receiving the indication in the paging message, the UE receives the corresponding system information block carrying the connection release indication, immediately after receiving the paging message or in a next modification period following the received paging message.

At step S311, upon receiving the connection release indication, the UE determines whether or not the UE should release its RRC connection based on the received release information.

If the received release information includes one or more establishment causes:
  1) If the establishment cause indicates a specific cause that the UE has indicated during the RRC connection establishment for this RRC connection, the UE releases the RRC connection. Else, the UE does not release the RRC connection.
  2) If the establishment cause does not indicate a specific cause that the UE has indicated during RRC connection establishment for this RRC connection, the UE releases the RRC connection. Else, the UE does not release the RRC connection.

If the received release information includes a logical channel priority:
  1) if the highest logical channel priority for the configured (data) radio bearers is equal to or lower than the logical channel priority included in the release information, the UE release the RRC connection. Else, the UE does not release the RRC connection.
  2) if the lowest logical channel priority for the configured (data) radio bearers is equal to or lower than the logical channel priority included in the release information, the UE release the RRC connection. Else, the UE does not release the RRC connection.

If the received release information includes one or more logical channel priorities:
  1) if the UE does not have any configured (data) radio bearer of which logical channel priority is not included in the release information, the UE release the RRC connection. Else, the UE does not release the RRC connection. Namely, the logical channel priority included in the release information indicates that the corresponding logical channel should be released.
  2) if the UE does not have any configured (data) radio bearer of which logical channel priority is included in the release information, the UE release the RRC connection. Else, the UE does not release the RRC connection. Namely, the logical channel priority included in the release information indicates that the corresponding logical channel should be maintained.

If the received release information indicates that all UEs should release their RRC connections, the UE releases the RRC connection.

If the probability factor is received, only if the UE should release the RRC connection according to the conditions described above, the UE draws a random number, and then if the probability factor is lower than the random number, the UE releases the RRC connection. Else, the UE does not release the RRC connection. Or, if the probability factor is higher than the random number, the UE releases the RRC connection. Else, the UE does not release the RRC connection.

If the received release information indicates that the UE should reestablish the RRC connection, the UE performs the RRC connection reestablishment procedure instead of releasing the RRC connection, only if the UE should release RRC connection according to the conditions described above.

At step S320, upon release of the RRC connection, if the wait time is received together with the connection release indication, the UE starts a timer for the wait time and considers the cell as barred until the timer expires. If the cell is barred, the UE cannot access to the cell. The UE performs cell reselection while the timer is running.

At step S330, if the timer elapses up to the value of the wait time, the timer expires. Upon expiry of the timer, the UE alleviates the cell barring. Then, the UE may perform the RRC connection establishment procedure at the cell.

When the UE performs the RRC connection establishment, if the UE has released the previous RRC connection due to the connection release indication or the RRC connection release message with a specific release cause, e.g., set to 'overload', or if the UE has released the previous RRC connection due to the connection release indication or the RRC connection release message with the wait time, the UE indicates to the eNB via the RRC connection request message or the RRC connection setup complete message that the UE has released the previous RRC connection due to the group release indication or the RRC connection release message with either the specific release cause, e.g., set to 'overload' or the wait time. The UE may also signal the wait time to the eNB via the RRC connection request message or the RRC connection setup complete message.

Figure 10:
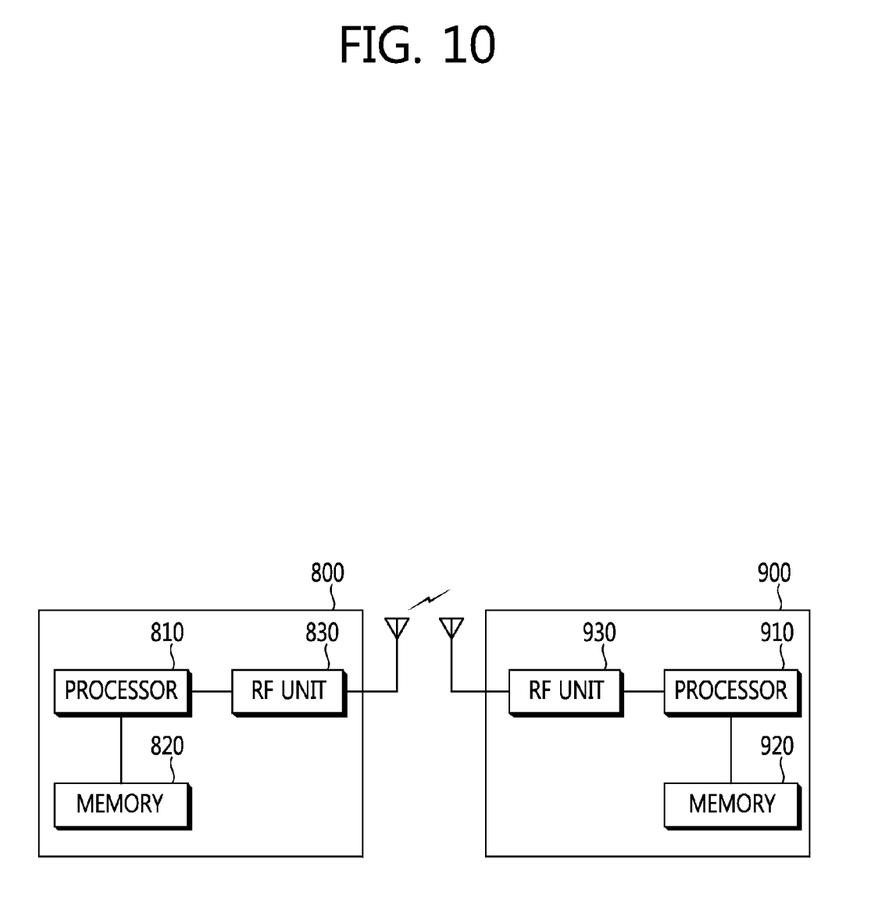
FIG. 10 is a block diagram showing wireless communication system to implement an embodiment of the present invention.

FIG. 10 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the embodiments of the present invention, the UE may perform per cell (frequency) based or per UE based LTE autonomous denial in multiple cells (frequencies) which can be all the serving cells including PCell and Scells or cells indicated by the network.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of releasing, by a user equipment (UE), a connection in a wireless communication system, the method comprising:
    establishing the connection with a network;
    receiving connection release information from the network via a paging message, system information or a radio resource control (RRC) message,
    wherein the connection release information includes an establishment cause or a logical channel priority for determining whether or not the UE releases the established connection with the network;
    selectively releasing the established connection based on the received connection release information,
    wherein the established connection is released when the establishment cause included in the connection release information is not in a list of a prioritized access,
    wherein the established connection is released when the highest logical channel priority for a configured data radio bearer is equal to or lower than the logical channel priority included in the connection release information,
    wherein the connection release information further includes wait time information indicating a time period during which access to the network is barred,
    wherein the connection release information further includes a probability factor for further determining the release of the connection, and
    wherein a random number is generated based on the received probability factor, and the established connection is released when the generated random number is lower than a threshold value.

2. The method of claim 1, wherein the prioritized access corresponds to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

* * * * *